Dec. 9, 1924.

R. C. BARTH 1,518,174

MACHINE FOR SHAPING THE TEETH OF BEVEL WHEELS BY GENERATING MOVEMENTS

Filed June 16, 1923  6 Sheets-Sheet 1

Inventor
R. C. Barth
by Langner, Parry, Card & Langner
Attys

Dec. 9, 1924.
R. C. BARTH
1,518,174
MACHINE FOR SHAPING THE TEETH OF BEVEL WHEELS BY GENERATING MOVEMENTS
Filed June 16, 1923
6 Sheets-Sheet 2

Inventor
R.C. Barth
by Langner, Parry, Card & Langner
Attys.

Dec. 9, 1924.
R. C. BARTH
1,518,174
MACHINE FOR SHAPING THE TEETH OF BEVEL WHEELS BY GENERATING MOVEMENTS
Filed June 16, 1923     6 Sheets-Sheet 3

Inventor
R.C. Barth
by Langner, Parry, Card & Langner
Att'ys.

Dec. 9, 1924.　　　　　　　　　　　　　　　1,518,174
R. C. BARTH
MACHINE FOR SHAPING THE TEETH OF BEVEL WHEELS BY GENERATING MOVEMENTS.
Filed June 16, 1923　　　6 Sheets-Sheet 6
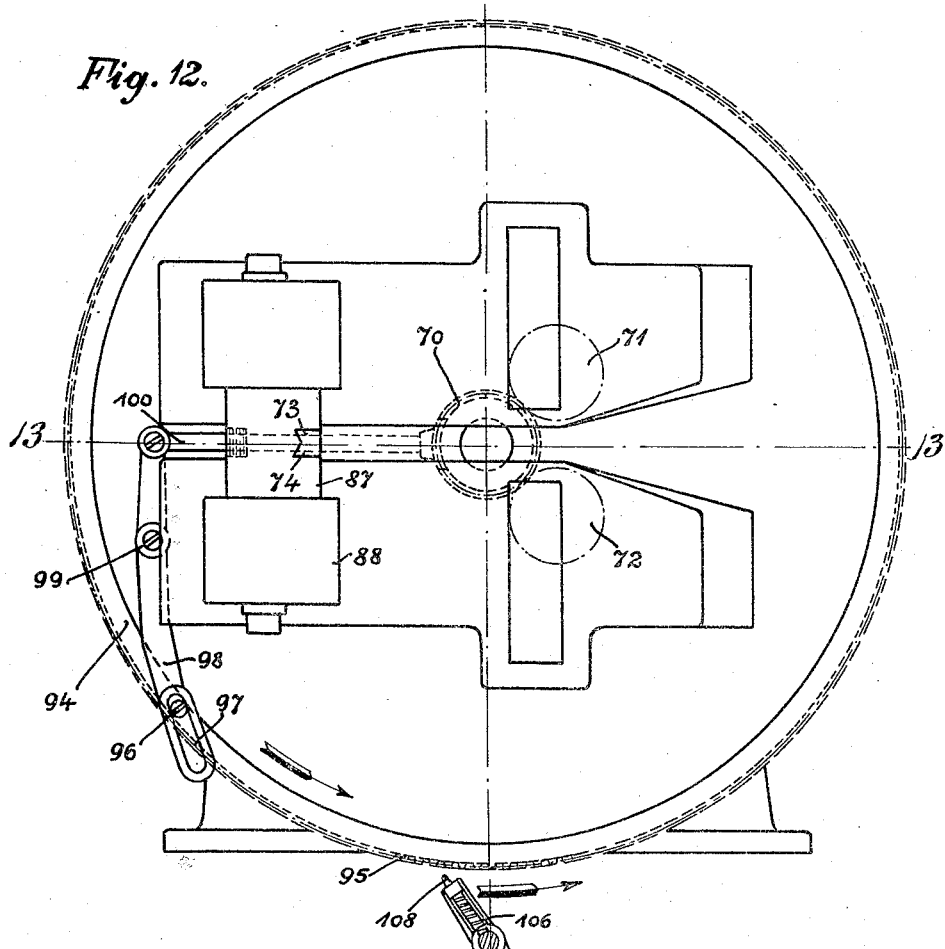
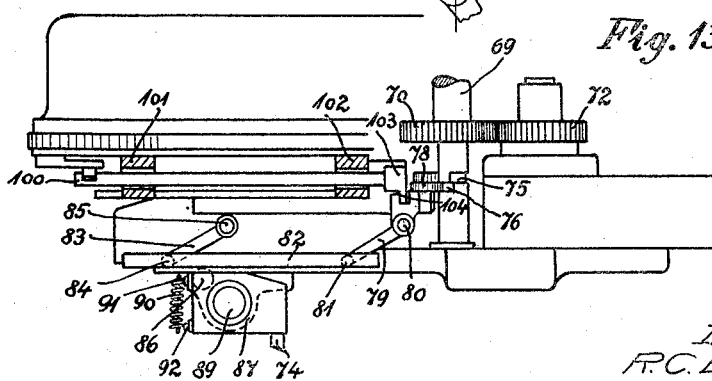
Inventor
R. C. Barth Patented Dec. 9, 1924.

1,518,174

UNITED STATES PATENT OFFICE.

ROBERT CURT BARTH, OF HAMBURG, GERMANY.

MACHINE FOR SHAPING THE TEETH OF BEVEL WHEELS BY GENERATING MOVEMENTS.

Application filed June 16, 1923. Serial No. 645,853.

*To all whom it may concern:*

Be it known that I, Dr. Ing. ROBERT CURT BARTH, citizen of Germany, residing at Hamburg, Klostertor 8, Germany, have invented certain new and useful Improvements in a Machine for Shaping the Teeth of Bevel Wheels by Generating Movements (filed in Germany on July 8, 1921), of which the following is a specification.

The present machines for cutting or shaping the teeth of bevel wheels by generating movements, in which the teeth are cut or shaped one after the other, operate in this way that when a tooth is finished the helicoidal movement between the tool and the blank is interrupted, and both are separated from one another by the tool carrier being oscillated about the main axis of the machine, that is, the point of the bevel wheel. When thereupon the blank is fed forward for the length of the pitch of the teeth, the tool again approaches the blank by the backward oscillation of the complete tool carrier. When thus the tool is again in working position the generating movement again sets in.

Machines of this description known heretofore have various considerable drawbacks.

In such machines above all the manner of carrying out of the feed movement requires to be improved on. This object in view, heretofore, a special device was employed to cause a rotary motion of the blank during the feed movement. A special drive was necessary for this device which was coupled at the proper moment with the worm shaft of the dividing wheel, generally mounted on the axis of the blank. The driving shaft of this device is rotated for one or more complete revolutions and transmits the necessary portion of rotation to the worm shaft by change wheels. The rotation of the driving shaft for one or more revolutions is effected by a notch coupling the locking lever of which also causes the drive to engage or to release the driving shaft of the device as the case may be. All these means and devices are extraordinarily complicated, and therefore require high costs in manufacture and are very unreliable in operation.

Moreover, for the construction of the machine it is of great disadvantage that a heavy part of the machine such as the tool carrier or the tool rest is not bolted to the frame of the machine, but must be guided for carrying out the oscillatory movements. This is of particular disadvantage for this reason that owing to the movability the accuracy suffers. Another disadvantage of the known machines is to be found in the necessity to provide a special drive for the oscillatory movements of the tool carrier. In addition the driving mechanism must operate very accurately to obtain always the exact position of the tools, because otherwise no accuracy of the blank to be operated upon can be arrived at. Moreover, a space of time is necessary to initiate the movement of the tool carrier and to change the direction of motion.

The present invention refers to a machine for shaping the teeth of bevel wheels by generating movements and has for its object to avoid all the drawbacks mentioned above, the gears being compact and simple, and working with absolute reliability.

In the new machine all the movements of the blank carrier and the face plate are carried out about their own fixed axes, whereby after completing one cycle of operation the tools and the blank are disengaged and the rotative movements of the tools are interrupted to such an extent, until the continued rotation of the blank has completed one or more divisions. The kinematic reversing is of course possible. Hereby the tools will be lifted off only to such an extent that an undisturbed backward oscillation can be carried out for causing a divisional feed whereupon after completion of the latter the blank and the face plate wheel will be rotated backwardly to such an extent that the blank is free to be rotated for itself without being hindered by contacting with the tool.

In the drawing the invention is illustrated by way of example on a machine for shaping the teeth of bevel wheels.

The Figs. 7-10 illustrate divers positions of the couplings.

Figure 11:
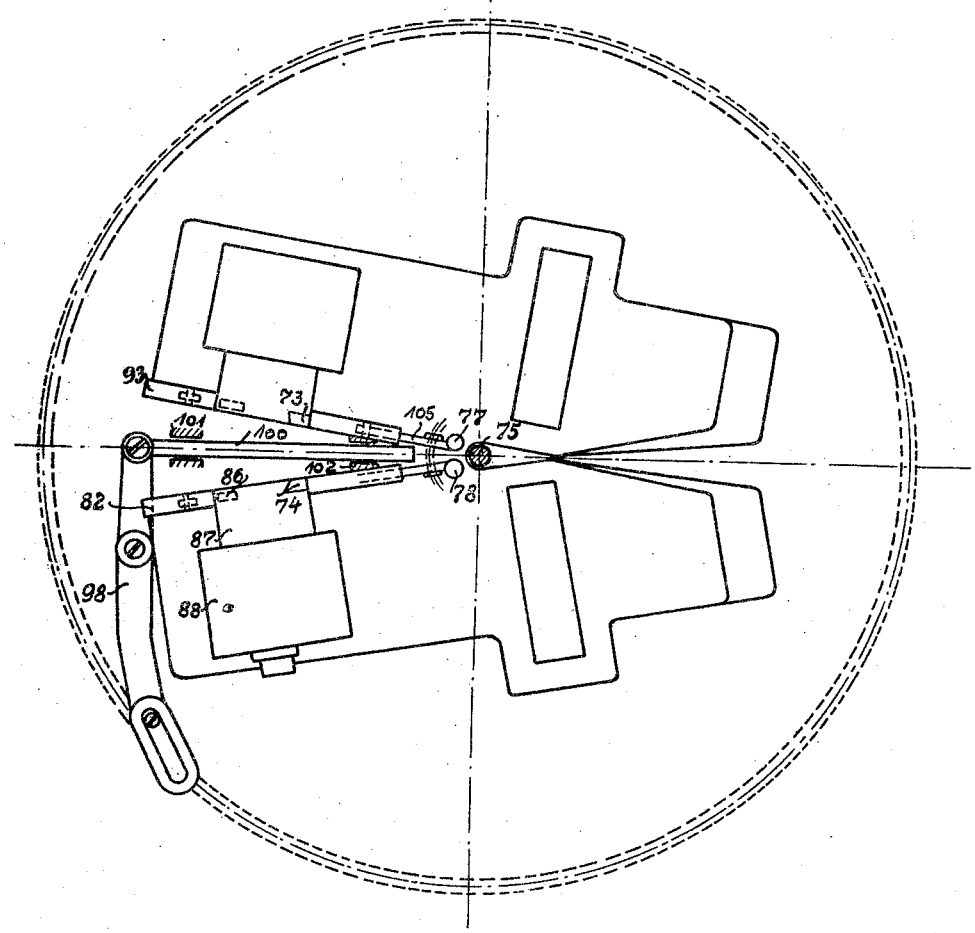

Fig. 11 is a front view of the tool carrier drawn to a larger scale.

Fig. 12 is a similar view in a different position, and

Fig. 13 is a plan view of the part shown in Fig. 12 partly in section drawn to the line 13—13, the upper ram being removed.

Figure 2:
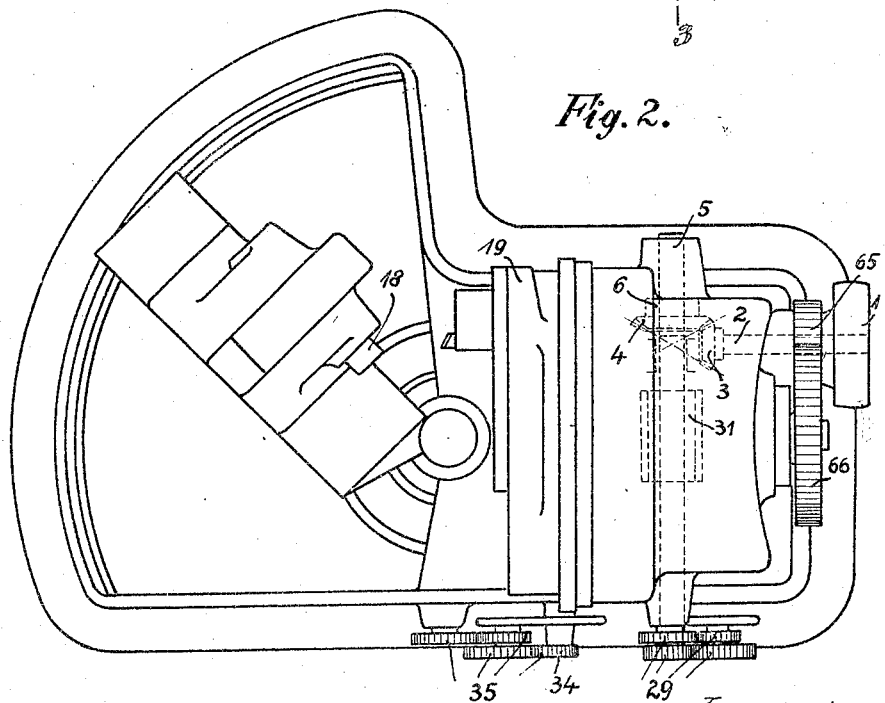
Fig. 2 is a plan of the machine.

The machine is driven from the belt-pulley 1, the shaft 2 of which by the aid of the bevel wheels 3 and 4 drives the shaft 5, (Fig. 2). The bevel wheel 4 is keyed to the spur wheel 6 (Fig. 3), the rotation of which is transmitted by aid of the gear 7 to the pinion 8, and by the aid of the shaft 9 to the change gears 10, 11, 12 and 13. The pinion 8 is keyed to the tubular shaft 14 loosely mounted on the shaft 15 driven in opposite direction by the change wheel 13. Moreover, the gear 16 is mounted on the shaft 15, and engages the gear 17, from which all rotary movements of the blank carrier 18 and the face plate 19 are derived.

On the hollow shaft 14 two clutch sleeves 20 and 21 are slidably but not rotatably mounted. The sleeve 20 can be thrown in gear with the spur wheel 16 by its teeth 22 engaging corresponding teeth on this wheel 16, and the sleeve 21 can be moved to allow its teeth 23 to engage the teeth 24 of the spur-wheel 25 loosely mounted on the hollow shaft 14. On the other side of the gear 16 there is a third clutch sleeve 26, which is driven by the aid of a free wheel clutch 27 from the shaft 15 and is adapted to engage by its teeth 26$^a$ the corresponding teeth of the gear 16 on this side.

Figure 1:
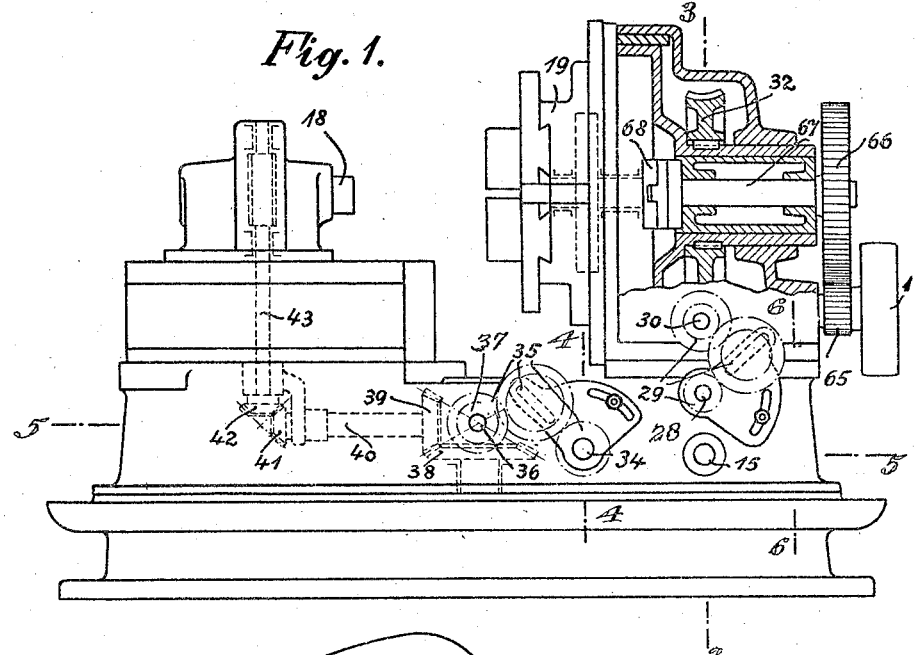
Fig. 1 is a front view of the machine partly in section showing the means of driving the face plate.
Figure 3:
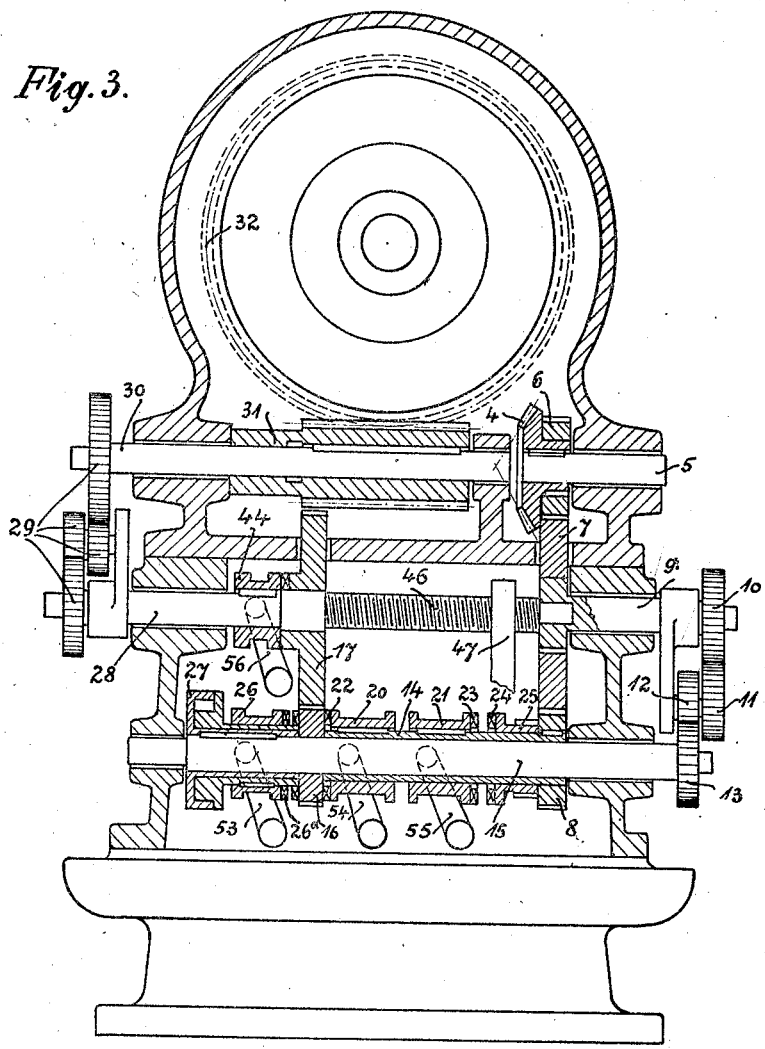
Fig. 3 is a section drawn to the line 3—3 of Fig. 1 showing the main gearing of the tool and the blank, and also the corresponding couplings.
Figure 4:
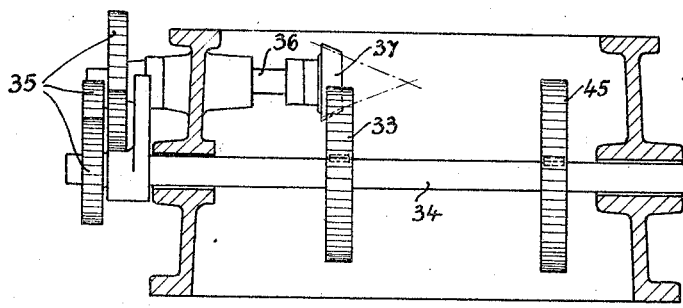
Fig. 4 is a section drawn to the line 4—4 of Fig. 1.
Figure 5:
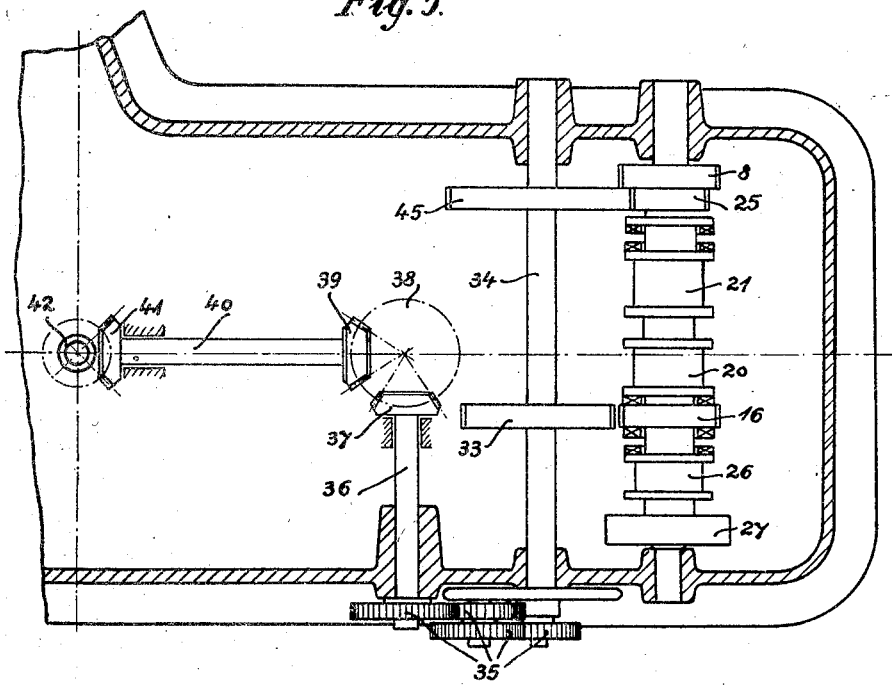
Fig. 5 is a horizontal section drawn along the line 5—5 of Fig. 1 to a larger scale.

The gear 17 drives by the shaft 28 and the set 29 of change wheels the shaft 30, which carries the worm 31 for the worm wheel 32 connected with the face plate. Moreover, the gear 17 engages the gear 33 of the intermediate shaft 34 (Fig. 4), which by aid of the change wheels 35 shown in Figs. 5 and 1, the shaft 36 and the bevel wheels 37, 38, 39 operates the shaft 40 and by the bevel wheels 41, 42 also the upright shaft 43. By these means the rotation of the blank carrying spindle 18 is effected. The operative connection between the gear 17 and the shaft 28 is brought about by a releasable one-tooth clutch 44 (Fig. 3).

The rotation of the gear 17 may also be obtained from the gear 25 by the aid of the gear 45 engaging the gear 25 (Figs. 3-5), and mounted on the intermediate shaft 34. The quick operation thus produced will be transmitted to the face plate and to the blank carrying spindle 18 as described above.

The main operative steps of the machine are as follows:

1. *The forward generating movement of the tool and the blank, that is slow fed.*—This operative step is carried out from the gear 16 driven by the main drive, the gear 7, the shaft 9, the change wheels 10, 11, 12, 13 and the shaft 15. The clutch sleeve 26 by its teeth 26$^a$ is thrown into gear with the wheel 16, which transmits the rotation of the shaft 15 to the gear 17, and the one-tooth coupling 44 driving on the one hand the face plate or the tools by the shaft 28, the change wheels 29, the shaft 30 and the worm gear 31, 32, and on the other hand the blank carrying spindle 18 by the gear 33, the shaft 34, the change wheels 35, the shaft 36, the bevel wheels 37, 38, 39, the shaft 40, the bevel wheels 41, 42 and the worm gear 43. The various positions which the different clutch sleeves occupy will be gathered from Fig. 7, the clutches 26 and 44 being thrown into gear, and the clutches 20, 21 being out of gear.

Figure 8:
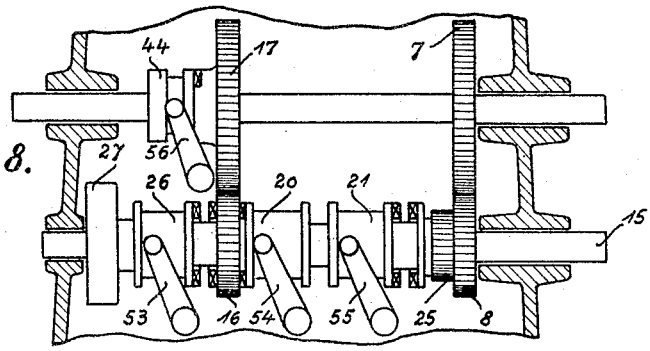

2. *Backward generating movement of the tools and the blank, that is quick return movement.*—In this case the drive is executed by the gear 7, the pinion 8 and the hollow shaft 14. The clutch sleeve 20 will be thrown into gear with the toothed wheel 16, the clutch sleeves 21 and 26 remaining out of gear (Fig. 8). Since the direction of rotation of the clutch sleeve 20 is the reverse to that of the sleeve 26 the gear 17 will now be rotated in opposite direction. The wheel 17 initiates the movement as before and transmits the movement to the tools and the blank. Now, since the ratio of gear of the toothed wheels 7 and 8 is larger than that of the change wheels 10, 11, 12, 13, the rotation of the tools and the blank must be quicker.

Figure 6:
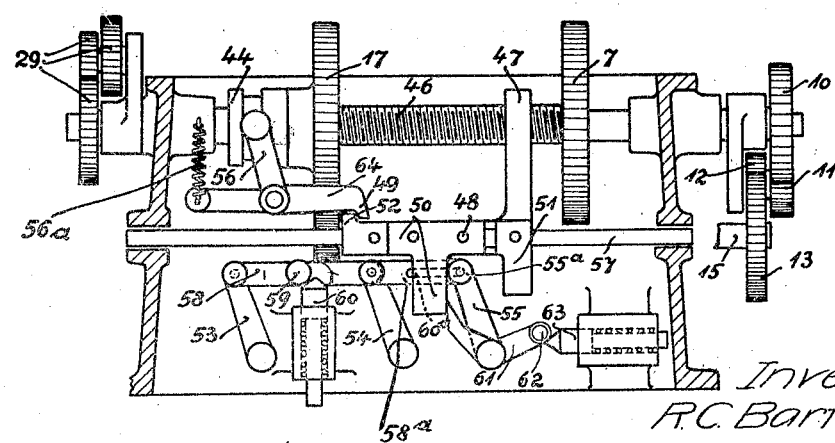
Fig. 6 is a central section of the machine drawn to the line 6—6 of Fig. 1.

3. *The feed movement of the blank and the division of the teeth.*—When the backward movement is finished, which is done as soon as the cutters are fully moved away from the blank, the feed movement is initiated. For this purpose the clutch 44 will be disengaged from the wheel 17. The clutch 44 has only one single tooth, and the wheel 17 has only one notch in its boss to correspond with this single tooth. The clutch will be positively driven in such manner that its tooth is fully drawn away out of the notch of the wheel. Then the clutch 44 is released and is acted upon by the spring 56$^a$ (Fig. 6). When a revolution of the wheel or gear 17 is completed the tooth of the clutch 44 will again enter the notch in the wheel 17. During the feeding movement the clutches are in the position shown in Fig. 9, that is to say the clutch 20 is thrown into gear, and the clutches 21, 26 and 44 are out of gear. The rotation of the gear 17 on being slowly driven takes place over the gears 33—43, and will thus be slowly transmitted to the blank. The face plate at this time is standing still. When now the tooth of the clutch sleeve 44 enters the notch of the wheel 17 the rotations of the blank and the face plate will then again be carried out together. Before this the blank has been further rotated with regard to the tools. The ratio of the change gear 35 is so chosen that the blank during the rotation of the wheel 17 is moved for the division or pitch of the teeth. The feed is thus completed.

Figure 10:
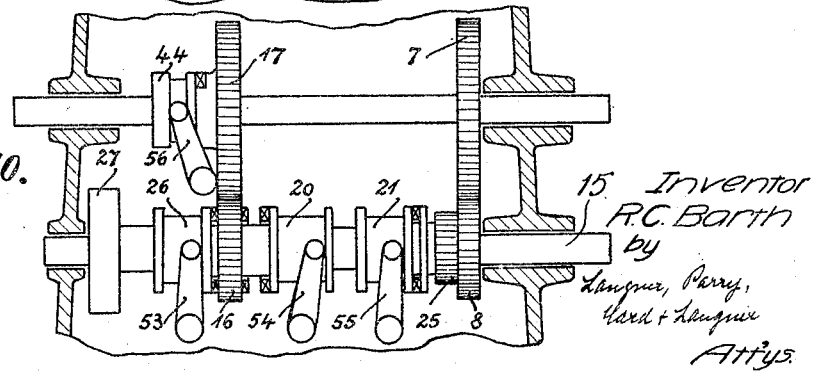

*4. The forward generating movement of the tools and the blank for avoiding the lost motion and the idle stroke, that is, quick forward movement.*—After completing the feed movement the motion of the tool and the blank will be reversed. For this purpose the clutch sleeve 20 will be disengaged from the wheel 16, and the clutch sleeve 21 will be moved so as to engage the wheel 25 (Fig. 10). Then also the clutch sleeve 26 engages the wheel 16, that is to say the drive for the slow forward movement is thrown into gear as well as that for the quick forward movement. This is possible because the clutch sleeve 26 is connected with the shaft 15 by the free wheel clutch 27, and the former can be rotated relatively to the inner catch of this free wheel clutch. The quick forward movement will be caused by the wheel 25 by the aid of the gear 45, the intermediate shaft 34 and the toothed wheel 33, and also by the wheel 17 which, as has been described above, can transmit its rotation to the face wheel as well as to the blank.

*5. Control of the clutches.*—The automatic operation of the machine depends on the exact control of the clutches 20, 21, 26 and 44. The movement of these clutches will be brought about by the screw spindle 46 firmly connected with the shaft 28 by the aid of the running nut 47 (Fig. 6), the horizontal arm 48 of which carries shoulders 50 and 51 and an oblique projection 52 for operating the forked levers 56 for the clutch 44. The movement of the clutch sleeve 26 is caused by the aid of the fork 53, and that of the clutch sleeve 20 by the aid of the fork 54 and that of the clutch sleeve 21 by the aid of the fork 55. The one-tooth clutch 44 will be moved by the fork 56 (Figs. 3 and 6). The running nut 47, 48 will be prevented from rotation by the guide rod 57. The forks 53 and 54 are connected with one another by a link 58 carrying a roller 59. This roller can be engaged by a spring-pressed piston-like bolt 60, which has a wedge shaped cam at its end. By the engagement of this bolt 60 the clutch forks 53 and 54 will be held yieldingly in their operative positions, that is to say the position at the right-hand side or at the left-hand side respectively. The clutch fork 55 will be taken along only in one direction by a prolongation 58$^a$ which is rotatably linked to the connecting rod 58. This fork engages by a stud 55$^a$ a slot 60$^a$ of the said prolongation, so that the fork 55 will be taken along by the said prolongation 58$^a$, when the stud 55$^a$ projects into the slot 60$^a$ at its end, and the direction of movement of the link 58 is such, that the end of the slot presses against the stud. Thus when the fork 55 is in the position of Fig. 6 the fork 55 at first, when the forks 53 and 54 move towards the right, will not yet partake of the movement, because the stud 55$^a$ is adapted to slide along the slot 60$^a$. However, when contrary to this the forks 53, 54 and 55 are in their utmost position towards the right a movement of the forks 53, 54 would at the same time cause a movement of the fork 55 towards the left, because the stud 55$^a$ is engaged by the right hand end of the slot 60$^a$. An arm 61 is attached to the fork 55 at an angle and carries at its end a roller 62, which is adapted to engage the wedge shaped cam formed at the end of a spring pressed bolt 63. This bolt holds the fork 55 in its position by the tension of the spring of the bolt.

The running nut 47 will be moved together with its horizontal arm 48 on the screw spindle 56 during the slow feeding movement and during the quick movement in advance towards the left, and on the quick backward movement towards the right.

Figure 7:
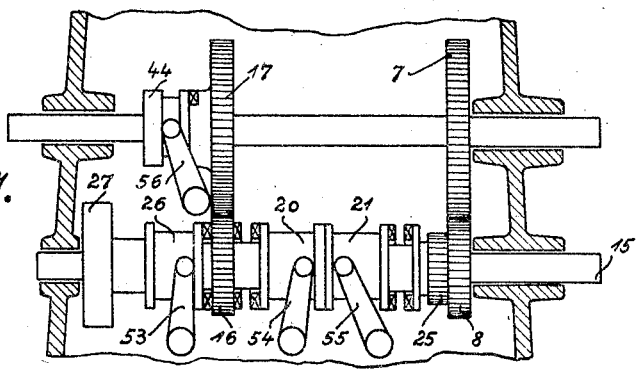

During the forward generating movement, that is to say when in the position in Fig. 7, the clutch sleeve 26 will be in the right-hand position, that is to say in engagement with the wheel 16. In this position it will be held by the spring pressed bolt 60, which by the right side of its wedge shaped end presses against the roller 59 on the connecting rod 58 of the forks 53 and 54. At the same time the spring-pressed bolt 60 holds the clutch sleeve 20 forcibly in its disengaging position. During the slow feeding movement the nut 47 moves towards the left, and the shoulder 50 engages the fork 53. Thus the roller 59 will be drawn over the spring-pressed bolt 60 which yields downwardly until the point of the wedge-shaped end is passed. Thereupon the spring-pressed bolt 60 urges the roller 59, and therefore also the forks 53 and 54 suddenly towards the left. The consequence is that the sleeve 26 will be released from the wheel 16, and the sleeve 20 will engage this wheel (Fig. 8). Thus the slow drive will be interrupted and the quick return movement is initiated.

Figure 9:
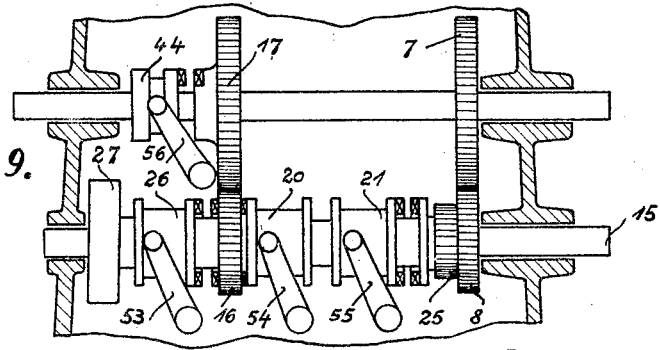

By the reverse movement of the wheel 17 and the screw spindle 46 for carrying out the quick return movement the nut 47 will be moved towards the right. At the end of this return movement the oblique face or cam 52 of the nut 47 engages the lip 49 at the end of the lever 64 of the clutch fork 56. The lever 64 will thus be oscillated upwardly and the fork 56 is moved towards the left, that is to say the sleeves 44 will be disengaged from the wheel 17 (Figs. 6 and 9). Thus the feeding movement of the blank is initiated. When this movement is completed the shoulder 50 engages the fork 55 of the sleeve 21. Since in the position shown in Fig. 9 the stud 55$^a$ at the end of the fork 55 is pressed against the right-hand end wall of the slot 60$^a$ the fork 55 will carry along with it the link 58 and thus move the forks 53 and 54 towards the right. The shoulders 49 and 50 are so positioned that the arm 61 of the clutch fork 55 holds the roller 62 just above the point of the spring-pressed bolt 63 when the feeding movement of the blank is completed. At the same movement the roller 59 which together with the link 58 is moved towards the right, passes the point of the spring-pressed bolt 60, so that the two spring bolts 60 and 63 move the clutch forks 53, 54 and 55 suddenly towards the right. The clutches will then be in the position shown in Fig. 10, that is to say the sleeve 20 is out of gear, the quick return movement is interrupted, the sleeve 21 is thrown in gear, that is to say the quick preliminary movement is started, and the sleeve 26 is also thrown in gear, that is to say the drive for the slow movement is started at the same time. The latter, as has been explained above, is possible owing to the free wheel clutch 27.

When the quick preliminary movement is finished, during which the nut 47, 48 is moving towards the left, the shoulder 51 moves the clutch fork 55 towards the left, until its arm 61 passes beyond the point of the spring-pressed bolt 63. Thereupon the clutch fork and together with it the sleeve 21 is suddenly moved towards the left and thrown out of gear, that is to say the quick preliminary movement is stopped. The clutches 26 and 20 during the movement will be inoperative. The position shown in Fig. 7 will again be attained, and the slow forward feeding movement can commence, since the free wheel clutch 27 operates the sleeve 26.

6. *The disengagement of the tools.*—In order to avoid the cutters during the return movement on the feed movement to slide on the finished or planed surfaces it is necessary to lift them off to a slight degree. The lifting off thus is carried out alternatively because when one cutter carries out a cut thus being in working position the other cutter must be on the way of its return stroke, and therefore must be lifted off.

The operation of the tools generally is carried out in a known manner from the pulley 1 by the aid of the gears 65 and 66, the shaft 67 and the cross joint coupling 68 (Fig. 1), which transmits its rotation to the shaft 69 (Fig. 13). A gear 70 is mounted on this shaft and engages the gear 71. 72 of those crank gearings from which the usual cam disks or the cutters 73 and 74 derive their reciprocating movement (Fig. 11). The shaft 69 is provided at its end with two eccentrics 75 and 76. Against the outer surface of the eccentric 75 a roller 77 and against the outer surface of the eccentric 76 a roller 78 bears. The construction of the two cutters is similar so that in the following only that of the cutter 74 is described which is operated by the roller 78. This roller 78 is rotatably mounted on the two armed lever 79 (Fig. 13), which oscillates about the stud 80 attached to the ram guide, and which is connected with one arm by the stud 81 to the rail 82.

The eccentric 76 gives the roller 78 and therefore also the lever 79 an oscillatory movement about the stud 80, and thus operates the rail 82. The movement of the rail 82 is controlled by being attached to a second arm 83, which engages the rail by the stud 84, and is pivoted to the ram guide by the stud 85. The arms 83 and 79 are of equal length, and the studs 80 and 85 and the studs 81 and 84 are so positioned that the arms 79 and 83 run parallel to one another. Thus when the arm 79 is moved the rail 82 will be moved parallel to itself. A roll 86, which is attached to the cutter holder 87, bears against the rail 82. The holder 87, which carries the cutter 74, is rotatable about the stud 89, which is journaled in the cutter holder casing 88 (Figs. 11 and 12). The cutter holder 87 will be pressed with its roller 86 against the rail 82 by the spring 90 (Fig. 13), which is attached with one end to a hook 91 of the casing 88, and with its other end to a pin 92 of the cutter holder 87, so that a positive engagement of the roller 86 with the rail 82 is guaranteed. When the rail 82 is raised by the action of the eccentric 76 the cutter holder will oscillate about the stud 89, and the cutter will be lifted off from the planed surface. When the cutter is on its forward movement, that is to say when cutting, the roller 78, will be released from the eccentric, and the rail 82 will be pressed downwardly by the cutter holder acted upon by the spring 90, and thus the cutter holder is held against the fixed edge of the guide, so that it finds a decided hold.

The position of the eccentrics 75 and 76 is such that the movements of the rollers 77 and 78 and the corresponding rail for the cutter 74 or the rail 93 for the cutter 73 respectively (Fig. 11) will take place when the cutters are in their dead points, that is to say at the commencement or the ends of the forward motion or vice versa of the return movement.

When the forward generating movement is finished, that is to say when a tooth is finished and the backward generating movement sets in, the two cutters must be continuously lifted off in order to avoid the contact of the cut surface during the forward movement, because the reciprocating movement of the cutters is not discontinued.

For this purpose the rails 82 and 93 are continuously held in their raised position. This raised position is, however, still somewhat higher than when the raising is carried out by the eccentric, so as to allow the cutters to stand away from the cut surfaces still to a greater extent.

The rotatable part, which rotates within the casing of the machine and to which is attached the guide path of the ram, carries a crown or rim 94 of teeth 95 (Fig. 12). This toothed rim 94 is rotatable for itself on the rotatable part and will move on the forward and backward generating movements of the rotatable part. A stud 96 is attached to the toothed rim 94 and is adapted to engage in a slot 97 of the double armed lever 98. This lever is pivoted by the pin 99 to the rotatable part and its second arm is rotatably connected with a rod 100, which is adapted to slide in bearings 101 and 102 attached to the rotatable part (Fig. 13). The other end of the last named rod carries a catch 103, which is adapted to engage into a notch 104 of the lever 79 and into a similar notch of the lever 105, which is operated by the roller 77 and transmits its movement to the rail 93 (Fig. 11). The lever 98 will be in the position shown when the forward generating movement takes place, that is to say during the shaping of a tooth. When the generating movement is reversed from forward to backward the toothed rim 94 will be relatively rotated with regard to the rolling body, that is to say in Fig. 12 in counter-clockwise direction. The stud 96 will then move along the slot 97 and rotates the lever 98 about the pivot 99 so that the rod 100 is moved to the left from the position shown in the drawing. When this movement takes place the pawl 103 will move the lever 79 or 105 respectively in such manner that the rails 82 and 93 are raised in the manner described and thus both cutters will be raised from the cut surface at the same time.

The movement of the toothed rim 94 relatively to the rotative part will take place from the rods of the clutch 20 for the quick backward movement. When this clutch is thrown into gear the pawl 106 will be moved towards the right. Thus the spring-pressed tooth 108 engaging a gap between the teeth 95 rotates the toothed rim 94 until the stud 96 has moved up to the other end of the slot 98. In this position the toothed rim 94 or the stud 96 will remain at rest until the backward generating movement is finished. At the end of the backward generating movement the clutch 20 for the quick backward motion will be thrown out of gear, whereby the rod rotates the pawl 106 towards the left (Fig. 12). Since the throwing into gear and the throwing out of gear of the clutch 20 takes place at a short stroke also the movement of the pawl 106 will be sudden. When the pawl 106 is moved towards the left also by the tooth 108 the rim 94 will now be rotated clockwise relatively to the rotatable part, and by the stud 96 the lever 98 and also the rod 100 is brought into the position in the drawing, that is to say the continued raising of the rails 82 and 93 is again interrupted.

I claim:

1. A machine for shaping the teeth of gearings by generating movements, comprising, a blank carrier, means to rotate the blank carrier and a blank carried thereby, about the axis of the blank, cutters, a face plate carrying the cutters, means to rotate the face plate about its axis and in synchronism with the rotation of the blank, said axes being fixed in space, means to reverse rotary movement of both the blank and the face plate after operation thereof, means to cause backward movement of the face plate and to interrupt the backward movement when the cutters disengage from the blank, means to rotate the blank backwardly for not less than one length of the pitch after disengagement of the cutters, and means to again rotate both the blank and the face plate, after the said backward rotation of the blank after disengagement of the cutters.

2. A machine for shaping the teeth of bevel wheels, according to claim 1, comprising, means to reciprocate the cutters carried by the face plate and means to raise the cutters away from the work after every forward reciprocation to an amount such as to allow their undisturbed backward reciprocation, whereby to prevent the face on the tooth just cut from being injured.

3. A machine for shaping the teeth of bevel wheels, according to claim 1, comprising, means for carrying out the backward movements of the cutters, means for carrying out a quick partial rotation of the blank, and means for carrying out a quick preliminary forward movement of the cutters until they engage the blank.

4. A machine for shaping the teeth of bevel wheels, according to claim 1, comprising, a common gear for operating the cutters and the blank, a main driving member, a shaft continuously driven by the driving member and arranged to rotate the common gear in one direction, and a tubular shaft loosely mounted on the first named shaft and arranged to rotate the common gear in the other direction.

5. A machine for shaping the teeth of bevel wheels, according to claim 1, comprising, a common gear for rotating the cutters and the blank, a main driving member, a shaft continuously driven by the driving member, a toothed wheel loosely mounted on the said shaft and in mesh with the said common gear, a clutch sleeve on the said shaft for coupling the said toothed wheel for effecting a slow feeding movement, a tubular shaft loosely mounted on the first named shaft and arranged to be rotated in an opposite direction to that of the first named shaft, and a clutch sleeve mounted on the tubular shaft and arranged to couple the tubular shaft to the toothed wheel whereby to transmit rotation for the quick backward movement.

6. A machine for shaping the teeth of bevel wheels, according to claim 1, comprising, a common gear for rotating the cutters and the blank, a main driving member, a shaft on which the common gear is loosely mounted and which is arranged to transmit rotation to the tool-carrying rotatable part, a one-toothed clutch sleeve mounted on the said shaft and arranged to couple the common gear to the shaft and to be thrown out of gear when the common return movement is completed, and change gears positioned intermediate the said common gear and the blank carrier and arranged to transmit rotation to the blank for the length of the pitch, on a complete revolution of the said common gear.

7. A machine for shaping the teeth of bevel wheels, according to claim 1, comprising, a common gear for rotating the cutters and the blank, a main driving member, a shaft continuously driven by the driving member, a toothed wheel loosely mounted on the said shaft and in mesh with the said common gear, a clutch sleeve on the said shaft for coupling the said toothed wheel for effecting a slow feeding movement, a tubular shaft loosely mounted on the first named shaft and arranged to be rotated in an opposite direction to that of the first named shaft, and a clutch sleeve mounted on the tubular shaft and arranged to couple the tubular shaft to the toothed wheel whereby to transmit rotation for the quick backward movement, comprising, a second clutch sleeve slidably mounted on the said tubular shaft and arranged to cause a quick preliminary movement in the direction opposite to that of the quick backward movement, an intermediate shaft arranged to be driven by the tubular shaft by the aid of the last named clutch sleeve and a change gear driven by the said intermediate shaft and arranged to operate the blank carrier when the last named clutch sleeve is thrown into gear and the two other clutch sleeves are thrown out of gear.

8. A machine for shaping the teeth of bevel wheels, according to claim 1, comprising, a common gear for rotating the cutters and the blank, a main driving member, a shaft continuously driven by the driving member, a toothed wheel loosely mounted on the said shaft and in mesh with the said common gear, a clutch sleeve on the said shaft for coupling the said toothed wheel for effecting a slow feeding movement, a tubular shaft loosely mounted on the first named shaft and arranged to be rotated in an opposite direction to that of the first named shaft, and a clutch sleeve mounted on the tubular shaft and arranged to couple the tubular shaft to the toothed wheel whereby to transmit rotation for the quick backward movement, comprising, a second clutch sleeve slidably mounted on the said tubular shaft and arranged to cause a quick preliminary movement in the direction opposite to that of the quick backward movement, an intermediate shaft arranged to be driven by the tubular shaft by the aid of the last named clutch sleeve and a change gear driven by the said intermediate shaft and arranged to operate the blank carrier when the last named clutch sleeve is thrown into gear and the two other clutch sleeves are thrown out of gear, comprising, a lead nut, a screw-threaded spindle loosely carrying the said common gear at its end, the nut being mounted on the spindle, and shoulders on the nut for controlling the clutch sleeves.

9. A machine for shaping the teeth of bevel wheels, according to claim 1, comprising, a common gear for rotating the cutters and the blank, a main driving member, a shaft continuously driven by the driving member, a toothed wheel loosely mounted on the said shaft and in mesh with the said common gear, a clutch sleeve on the said shaft for coupling the said toothed wheel for effecting a slow feeding movement, a tubular shaft loosely mounted on the first named shaft and arranged to be rotated in an opposite direction to that of the first named shaft, and a clutch sleeve mounted on the tubular shaft and arranged to couple the tubular shaft to the toothed wheel whereby to transmit rotation for the quick backward movement, comprising, a second clutch sleeve slidably mounted on the said tubular shaft and arranged to cause a quick preliminary movement in the direction opposite to that of the quick backward movement, an intermediate shaft arranged to be driven by the tubular shaft by the aid of the last named clutch sleeve and a change gear driven by the said intermediate shaft and arranged to operate the blank carrier when the last named clutch sleeve is thrown into gear and the two other clutch sleeves are thrown out of gear, comprising, a lead nut, a screw-threaded spindle loosely carrying the said common gear at its end, the nut being mounted on the spindle, and shoulders on the nut for controlling the clutch sleeves, comprising, forks for moving the clutch sleeves, the fork for the clutch for the slow forward movement being connected with the fork for the clutch for the quick return movement, whereby the operation of these two clutches is carried out together, while the fork of the clutch for the quick preliminary movement is positively connected with the other forks during the throwing into gear operation, but on the throwing out of gear operation it is operated independently by the spindle, and a free wheel clutch carried by the first named shaft and arranged to cause the slow forward movement, which is initiated at the same time as the quick preliminary movement.

10. A machine for shaping the teeth of bevel wheels, according to claim 1, the cutter carrier being rotatably mounted on tool holding casings, a rail for each cutter carrier for raising the cutter away from the cut surface, a spring yieldingly pressing the cutter carrier against the rail, means constraining each rail to parallel motion, eccentrics for alternately raising and lowering the rails, and a shaft carrying a toothed wheel for operating the cutter carrier and carrying the eccentrics for operating the rails.

11. A machine for shaping the teeth of bevel wheels, according to claim 1, the cutter carrier being rotatably mounted on tool holding casings, a rail for each cutter carrier for raising the cutter away from the cut surface, a spring yieldingly pressing the cutter carrier against the rail, means constraining each rail to parallel motion, eccentrics for alternately raising and lowering the rails, and a shaft carrying a toothed wheel for operating the cutter carrier and carrying the eccentrics for operating the rails, comprising a locking rod for holding the rails in raised position, a clutch sleeve, a toothed rim rotatably mounted on the rotatable part of the machine carrying the tool holders, a two-armed lever pivoted to the said rotatable part of the machine and having a slot at one end, a stud attached to the toothed rim and engaging the slot in the double-armed lever, and means for rotating the toothed rim by the aid of the said clutch sleeve, for the quick return movement.

Dr. Ing. ROBERT CURT BARTH.